3,138,577
SUSPENSION POLYMERIZATION OF VINYL CHLORIDE AND VINYL ACETATE
Milton W. Kline, Leominster, Mass., Samuel Loshaek, Stamford, Conn., and Sorrel Povlow, Philadelphia, Pa., assignors to The Borden Company, New York, N.Y., a corporation of New Jersey
No Drawing. Filed Oct. 12, 1961, Ser. No. 144,565
5 Claims. (Cl. 260—87.1)

This invention relates to a process for suspension copolymerization of vinyl chloride and vinyl acetate.

In such copolymerization there has been difficulty heretofore in avoiding production of objectionable amounts of oversize particles or in lack of clarity of solutions of the finished copolymer in the usual solvents such as acetone or methyl ethyl ketone. The oversize particles, such as those which are retained on a 40 mesh screen (420 microns) in a standard screening test, are usually accompanied in manufacture by formation of a cake that is hard, difficult to remove from the walls of the reactor, and economically wasteful. Also such oversize particles frequently occlude suspending agent or other foreign material and are not only difficult to wash free from said contaminants but also are so slow in dissolving that certain uses require screening of the copolymer beads before they are dissolved or compounded.

To decrease the proportion of such oversize particles special techniques have been proposed. These include (1) violence of agitation of degree not obtainable in many types of conventional copolymerization equipment and (2) selected suspending agents which are effective for particle size control but which cause the resulting copolymer, when dissolved in the ketones, for example, to give solutions that are not clear.

To avoid the lack of clarity of solutions of the washed beads, the interpolymer of vinyl methyl ether and maleic anhydride (PVM/MA) has been used as the suspending agent. As used heretofore it has given, however, the oversize particles in such amounts as at least 10% on 40 mesh and often 25%–40%.

The present invention provides a process in which this suspending agent can be used and is used in a combination that gives the desired clarity and also prevents formation of the relatively large amounts of the coarse beads. In representative runs we have reduced the amount of such beads retained on 40 mesh to less than 3%, without adversely affecting the rate of polymerization, the clarity of solutions of the product, the mean molecular weight of the copolymer or distribution thereof.

Briefly stated the invention comprises the suspension copolymerization of vinyl chloride and vinyl acetate in an aqueous liquid suspending medium including methanol in limited proporton at a pH between 2.5 and 6, the copolymer of vinyl methyl ether and maleic anhydride as suspending agent and an initiator of ethenoid monomer polymerization.

The exact mechanism by which the methanol in the small amount acts as a particle size controller in this copolymerization is difficult to ascertain. It is considered, however, that the methanol results in slight methanolysis of the anhydride portion of the suspending agent along with the predominant hydrolysis taking place, so as to increase the effectiveness of the suspending agent.

As to materials, the vinyl chloride and vinyl acetate monomers used are the ordinary commercial grades of those materials.

The initiator of the copolymerization, is any one of the organic, monomer soluble (usually called "oil soluble"), free radical generating compounds that are commonly used to initiate ethenoid bond polymerization in the suspension copolymerization of vinyl chloride and vinyl acetate. Examples are lauroyl peroxide, benzoyl peroxide, caprylyl peroxide bis-(azoisobutyronitrile, 2,4-dichlorobenzoyl peroxide, and the like. Inorganic, water soluble initiators such as hydrogen peroxide, potassium persulfate, ammonium persulfate and the like are not to be used in the copolymerization of this invention; if used, they give many coarse beads, usually 25%–50% of size to be retained on the 40 mesh screen, cloudy solutions of the beads in ketones and frequently resins of poor heat stability.

Inorganic buffering agents, such as sodium acetate or the sodium phosphates are also to be avoided in our copolymerization, to prevent development of these same undesirable properties.

A chain terminator is used ordinarily, to control the molecular weight of the resulting copolymerized vinyl chloride-vinyl acetate. When used, the terminator is any one that is conventional for this purpose in suspension polymerization of ethenoid monomers, suitable examples being trichloroethylene, carbon tetrachloride, chloroform, and bromoform.

As the suspending agent we have found nothing which is satisfactory with our small proportion of the methanol except the copolymer (sometimes referred to herein as the interpolymer) of vinyl methyl ether and maleic anhydride, i.e., the PVM/MA. We have used to advantage a grade in which the ratio of the two monomers represented in the polymer is approximately 1 mole of the vinyl methyl ether to 1 of the maleic anhydride and for which the specific viscosity, as measured in a 1% solution in cyclohexanone at 25° C., is 0.5–0.8. While other ratios and viscosities may be used, the one mentioned is satisfactory and commercially available. It is the one used in the examples later herein.

The water used is suitable in the deionized condition that is more or less customary in polymerizations of this type, so as to avoid occasional complicating effects of the ions present in ordinary water.

Other lower monohydric aliphatic alcohols such as ethanol or isopropanol are not as convenient or effective as methanol as the particle size control liquid but can be used.

Proportions of the several components are shown in the following table as those amounts that are permissible and also those recommended for best results.

| Component | Parts by Weight for 100 Parts Total of Vinyl Chloride and Acetate | |
|---|---|---|
| | Permissible | Recommended |
| Vinyle chloride | 50–99 | 80–95 |
| PVM/MA suspending agent | 0.03–0.5 | 0.05–0.2 |
| Methanol | 5–20 | 8–15 |
| Initiator of polymerization | 0.1–0.4 | 0.15–0.25 |
| Chain terminating agent | 0.0–3 | 0.5–2.0 |
| Water | 150–400 | 200–240 |

The proportion of the methanol recommended is about 2%–10% of the water in the suspension.

While the aqueous suspending medium should be acidic, as of pH above 2.5 and ordinarily 3–4, it is unnecessary and undesirable to add to the system any acid other than that normally supplied in small amounts by the monomers and the PVM/MA.

The components are charged to a pressure reactor fitted with an effective agitator, air is vented from the reactor as the air is replaced by vapors of the monomers, and the charge is maintained at a temperature for copolymerization, as within the approximate range 70°–180° F. for 8–15 hours. Temperatures and times outside these ranges may be used, adjustments being made if necessary between the temperature and time of reaction, to obtain substantially complete copolymerization of the ethenoid monomers as shown by the pressure in the reactor finally, at a steady temperature, becoming practically constant at a lowered level.

The invention will be further illustrated by description in connection with the following specific examples of the practice of it. In these examples and elsewhere herein, proportions are expressed as parts by weight except where specifically stated to the contrary.

*Example 1*

Suspension copolymerization was made using the materials and amounts thereof shown below, the proportions of the methanol and PVM/MA being varied as tabulated later herein.

| Component: | Parts for 100 parts total of monomers |
|---|---|
| (1) Deionized water | 220 |
| (2) Methanol | 10–15 |
| (3) Lauroyl peroxide | 0.2 |
| (4) Trichloroethylene | 0.8 |
| (5) PVM/MA | 0.1–0.15 |
| (6) Vinyl chloride (initial charge) | 37.4 |
| (7) Vinyl acetate | 16.0 |
| (8) Vinyl chloride (additional charge) | 46.6 |

Components 1, 3 and 5 were introduced into a glass lined pressure reactor of 300 gallon size or larger equipped with a Pfaudler impeller type agitator and at a temperature between room temperature, such as 60° and up to 125° F. The reactor was then evacuated momentarily to remove all air from the system. After the maximum evacuation had been obtained, the reactor was sealed, the agitator was started and the components 2, 4, 6 and 7 were charged in order. The pH then was about 5.0.

The contents of the reactor were heated to the desired polymerization temperature of 148° F. Then the remaining amount of vinyl chloride (component 8) was introduced continuously during the next 6 hours at the rate of approximately 8 parts of vinyl chloride per hour for the first 4 hours and 7 parts per hour for the last 2 hours. The pressure recorded during the polymerization dropped from its initial high of 110–120 p.s.i. to 20 p.s.i. where it became practically constant. The pH of the reacted mixture was 2.5. The reaction vessel was next vented to the atmosphere, for removal of any remaining monomers, and then stripped under vacuum at 100°–150° F. until substantially no more material volatilized.

The remaining slurry was then cooled and allowed to settle. The supernatant liquid was withdrawn by vacuum through a rubber hose of half inch diameter from above the settled layer of polymer beads. These beads were re-slurried with additional deionized water and then allowed to settle. The supernatant liquid was again withdrawn. The beads were reslurried in deionized water, the slurry then centrifuged to remove water, and the beads finally dried in a rotary drier at a temperature of 125° F.

The resin beads so made had a specific viscosity which, for a 1% solution of the beads in cyclohexanone at a temperature of 25° C., ranged in the various runs from 0.52 to 0.58, the specific viscosity being defined by the formula Specific viscosity $$= \frac{\text{visc. of solution} - \text{visc. of cyclohexanone}}{\text{visc. of cyclohexanone}}$$

The effects of proportions of the methanol and of PVM/MA on the percentage of particles of size over 40 mesh in screen size are shown in the following table along with control tests in which no methanol was used, these control tests being no part of the invention.

| Parts for 100 parts Total of Vinyl Chloride and Acetate | | Copolymer Particles Retained on 40 Mesh in Screening Test, percent by weight | Clarity of 25% Solution of Product in Ketones |
|---|---|---|---|
| Methanol | PVM/MA | | |
| 0 | 0.15 | 18.1 | Cloudy. |
| 10 | 0.15 | 2.4 | Good. |
| 15 | 0.15 | 0.2 | Good. |
| 0 | 0.10 | 10.7 | Cloudy. |
| 15 | 0.10 | 0.5 | Good. |

The last figure (0.5) in the third column is an average for two runs.

When the run using no methanol and 0.15 part of PVM/MA was repeated but with the inclusion of 0.02 part of polyvinyl alcohol, as supplementary suspending agent, the resulting copolymer, when dissolved in acetone and in methyl ethyl ketone to 25% solids, gave solutions that were cloudy and contaminated with undissolved material.

*Example 2*

The procedure and compositions of Example 1 including 0.15 part of PVM/MA and 10 parts of methanol were used except that there was incorporated also a supplementary suspending agent, namely polyvinyl alcohol in the proportion of 0.02 part by weight for 100 parts total of the monomers.

The product, although satisfactory in bead size, gave a cloudy solution of 25% resin solids in acetone, methyl ethyl ketone and methyl isobutyl ketone, even when the resin, before solution, had been washed ten times by the method in Example 1.

*Example 3*

This example is not a part of the invention but is given for contrast therewith.

The procedure and composition of Example 1 using 0.15 part of PVM/MA and 10 parts of methanol are used except that 0.1 part of potassium persulfate replaced the lauroyl peroxide used in Example 1.

The resulting product consisted of large beads, 28% of which were retained on the 40 mesh screen. The ketone solutions of this resin were very cloudy.

It will be understood that it is intended to cover all changes and modifications of the examples of the invention herein chosen for the purpose of illustration which do not constitute departures from the spirit and scope of the invention.

We claim:

1. In suspension co-polymerization the process which comprises suspending vinyl chloride and vinyl acetate monomers in a liquid suspending medium including water, an organic, monomer soluble, free radical supplying initiator of ethenoid bond polymerization, the copolymer of vinyl methyl ether and maleic anhydride as suspending agent and methanol, the methanol in combination with said suspending agent serving as particle size controller and the proportions by weight being 0.03–0.5 part of the said suspending agent, 5–20 parts of the methanol for 100 parts total of said monomers, and not more than about 10 parts of methanol for 100 parts of the water, maintaining the said monomers in suspension and warming the suspension until the monomers are copolymerized.

2. The process of claim 1, including maintaining the pH of the suspension during the warming approximately within the range 2.5–6.

3. The process of claim 1, the proportions of the vinyl methyl ether and maleic anhydride represented in the said polymer being about equimolar.

4. In the suspension copolymerization of vinyl chloride and vinyl acetate monomers, the process which comprises forming a suspension of 100 parts of said monomers containing 50–99 parts of vinyl chloride for 100 parts total of said monomers, 150–400 parts of water, 0.03–0.5 part of the copolymer of vinyl methyl ether and maleic anhydride in approximately equimolar proportions as suspending agent, 5–20 parts of methanol, the methanol in combination with said suspending agent serving as particle size controller, 0.2 part of lauroyl peroxide as ethenoid bond polymerization initiator, and 0.8 part of trichloroethylene as chain terminating agent, agitating the mixture during the introduction of the several components, maintaining the pH within the range approximately 2.5–6 during the said forming and agitation of the suspension, warming the suspension and continuing the agitation, until the pressure in the system falls to a level that is substantially constant for a given temperature, venting the reacted suspension to the atmosphere, removing volatile materials from the suspension and washing and drying the copolymer beads that remain.

5. The process of claim 4 which includes admixing the vinyl chloride in at least two portions, one of the said portions being admixed after the completion of the introduction of the vinyl acetate.

References Cited in the file of this patent
UNITED STATES PATENTS

| | | |
|---|---|---|
| 2,064,565 | Reid | Dec. 15, 1936 |
| 2,979,487 | Martin | Apr. 11, 1961 |
| 3,035,032 | Collinson et al. | May 15, 1962 |

FOREIGN PATENTS

| | | |
|---|---|---|
| 1,111,396 | Germany | July 20, 1961 |